(12) United States Patent
Merce et al.

(10) Patent No.: US 11,639,440 B2
(45) Date of Patent: May 2, 2023

(54) THERMOREVERSIBLE BITUMINOUS COMPOSITION

(71) Applicants: TOTAL MARKETING SERVICES, Puteaux (FR); SORBONNE UNIVERSITE, Paris (FR)

(72) Inventors: Manuel Merce, Benesse-Maremne (FR); Laurent Bouteiller, Bourg-la-Reine (FR); Sandrine Pensec, Vauhallan (FR); Thomas Coustham, Quarouble (FR)

(73) Assignees: TOTAL MARKETING SERVICES, Puteaux (FR); SORBONNE UNIVERSITE, Paris (FR)

( * ) Notice: Subject to any disclaimer, the term of this patent is extended or adjusted under 35 U.S.C. 154(b) by 192 days.

(21) Appl. No.: 17/270,351

(22) PCT Filed: Aug. 19, 2019

(86) PCT No.: PCT/FR2019/051932
§ 371 (c)(1),
(2) Date: Feb. 22, 2021

(87) PCT Pub. No.: WO2020/039140
PCT Pub. Date: Feb. 27, 2020

(65) Prior Publication Data
US 2021/0309859 A1    Oct. 7, 2021

(30) Foreign Application Priority Data
Aug. 22, 2018  (FR) ...................................... 1857588

(51) Int. Cl.
*C08L 95/00* (2006.01)
*C08K 5/21* (2006.01)

(52) U.S. Cl.
CPC ................ *C08L 95/00* (2013.01); *C08K 5/21* (2013.01)

(58) Field of Classification Search
CPC .................................. C08L 95/00; C08K 5/21
See application file for complete search history.

(56) References Cited

U.S. PATENT DOCUMENTS

| | | | |
|---|---|---|---|
| 2,987,515 | A | 6/1961 | Stromberg |
| 2010/0192804 | A1 | 8/2010 | Lapalu et al. |
| 2013/0298800 | A1 | 11/2013 | Lapalu et al. |

FOREIGN PATENT DOCUMENTS

CA          1 260 653 A      9/1989

OTHER PUBLICATIONS

Isare et al.; "Bisurea-based supramolecular polymers: From structure to properties;" C.R. Chimie; 2015; pp. 148-156; vol. 19.

(Continued)

*Primary Examiner* — Arrie L Reuther
(74) *Attorney, Agent, or Firm* — Oliff PLC

(57) ABSTRACT

The present invention relates to bituminous compositions comprising molecules of formula (I), (II) and/or (III). The invention also relates to the use of said bitumen compositions in the fields of road applications, particularly in the production of road binders and roadways in general, as well as in the fields of industrial applications. The invention also relates to a method for producing said bituminous compositions. The invention further relates to novel molecules that can be used in particular in the formulation of bituminous compositions.

20 Claims, 1 Drawing Sheet

(56) References Cited

OTHER PUBLICATIONS

Wang et al.; "Synthesis and Self-Assembling Properties of Polymerizable Organogelators;" Chem. Eur. J.; 2002; vol. 8, No. 8.
Isare et al.; "The Weak Help the Strong: Low-Molar-Mass Organogelators Harden Bitumen;" Langmuir Letter; 2009; pp. 8400-8403; vol. 25, No. 15.
Dec. 9, 2020 Search Report issued in International Patent Application No. PCT/FR2019/051932.
Dec. 9, 2020 Written Opinion of the International Searching Authority issued in International Patent Application No. PCT/FR2019/051932.

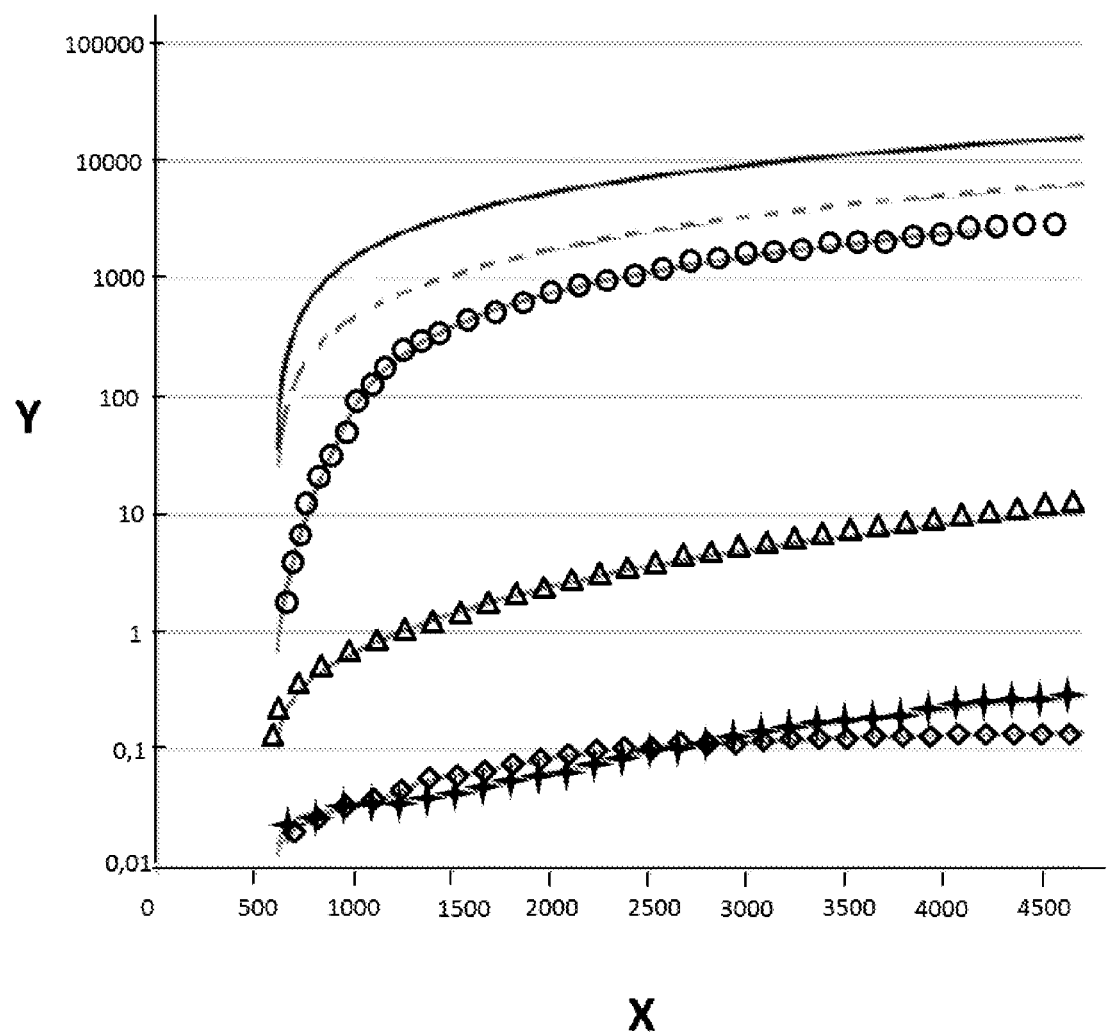

THERMOREVERSIBLE BITUMINOUS COMPOSITION

TECHNICAL FIELD

The present invention relates to the field of bitumens. A first aspect of the invention relates to novel bituminous compositions comprising novel molecules. These bituminous compositions are hard and have a good consistency at the operating temperatures and a viscosity similar to that of conventional bitumens of the same grade at the application temperatures. In particular, the invention relates to said solid compositions which are in divided form at ambient temperature.

The invention also relates to a process for preparing these bituminous compositions, notably when they are solid and in divided form at ambient temperature, and to the use thereof in the fields of road applications, notably in the manufacture of road binders, surfacing mixes and roadways in general, and in the fields of industrial applications.

The present invention also relates to a process for manufacturing surfacing mixes from the bituminous compositions according to the invention, and also to a process for transporting and/or storing and/or handling said bituminous compositions, notably at elevated ambient temperature.

The invention also relates to novel molecules that may be used notably in the formulation of bituminous compositions, preferably in the form of solid bituminous compositions which are in divided form at ambient temperature.

TECHNICAL CONTEXT

Bitumen or bituminous binder is the main hydrocarbon-based binder used in the field of road construction or civil engineering. In order to be able to be used as a binder in these various applications, bitumen must have certain physicochemical and mechanical properties. It must notably be sufficiently hard and must have a good consistency at the operating temperatures to avoid, for example, the formation of ruts caused by traffic. Bitumen must also be elastic to withstand the deformations imposed by traffic and/or temperature changes, these phenomena leading to cracking of the surfacing mixes or to stripping of the surface aggregates. Finally, bitumen must be sufficiently fluid at application temperatures that are as low as possible to allow, for example, good coating of the aggregates and laying of the surfacing mix on the road. The use of a bituminous binder thus demands a compromise between the hardness, the consistency, or even also the elasticity of the bitumen at the operating temperatures and low viscosity at the application temperatures.

Since bitumen alone is generally not sufficiently elastic, polymers which may optionally be crosslinked are added to bitumen. These crosslinked polymers give bituminous compositions markedly improved elastic properties. However, the crosslinking is generally irreversible: once the crosslinking has taken place, it is not possible to return to the initial state existing before the crosslinking reaction. Crosslinked bituminous compositions thus have good elastic properties, but their viscosity is very high. One of the drawbacks associated with this high viscosity is the need to heat the crosslinked bitumen to an application temperature higher than that of a noncrosslinked bitumen, which increases the energy expenditure and necessitates the use of additional protections for the operators.

Depending on the targeted application, it is necessary to find a good compromise between the mechanical properties including the elasticity, the hardness, the consistency, the fluidity and the viscosity, notably the hot viscosity of the binder.

Another problem in using bitumen is associated with its transportation, handling and storage. In general, bitumen is stored and transported hot, in bulk, in tanker trucks or in ships at high temperatures of the order of 120° C. to 180° C. However, the storage and transportation of hot bitumen presents certain drawbacks. The transportation of hot bitumen in liquid form is considered hazardous and it comes under rigid regulatory controls. This mode of transportation does not present any particular difficulties when the transportation equipment and infrastructures are sound. Should this not be the case, it may become problematic: if the tanker truck is not sufficiently thermally insulated, the viscosity of the bitumen may increase during an excessively long journey. Bitumen delivery distances are thus limited. Moreover, maintaining bitumen at high temperatures in the tanks or tanker trucks consumes energy. In addition, maintaining bitumen at high temperatures for a long period of time may affect the properties of the bitumen and thus change the final performance qualities of the surfacing mix.

To overcome the problems of the transportation and storage of hot bitumen, packagings for transporting and storing bitumens at ambient temperature have been developed. This mode of transportation of bitumen in packaging at ambient temperature represents only a tiny fraction of the amounts transported worldwide, but corresponds to very real needs for geographical regions that are difficult and expensive to access by conventional transportation means.

U.S. Pat. No. 3,026,568 describes bitumen pellets covered with a powdery material, such as limestone powder. However, this type of granular bitumen does not prevent creep of the bitumen, notably at elevated ambient temperature.

Patent application WO 2008/107551 describes a method for the reversible crosslinking of bituminous compositions based on the use of organogelling additives. The thermoreversibly crosslinked bituminous compositions thus obtained are hard at the operating temperatures and have a reduced viscosity at the application temperatures.

Patent application WO 2009/153324 describes bitumen pellets coated with a polymeric anticaking compound, in particular polyethylene. The drawback of this coating is that it modifies the properties of the bitumen during its road application.

Patent application WO 2016/016318 describes bitumen pellets comprising a chemical additive. These bitumen pellets enable the transportation and/or storage and/or handling of bitumen at ambient temperature without it undergoing creep, and also allow a reduction in the adhesion and agglomeration between the pellets.

Patent application U.S. Pat. No. 2,987,515 describes urethane derivatives comprising cyclic amidine groups and also the process for preparing them.

In the continuation of its studies, the Applicant has discovered, surprisingly, a novel bituminous composition comprising at least one bitumen and a mixture of at least one molecule of general formula (I) and of at least one molecule of general formula (II) and/or (III). The bituminous compositions thus developed are advantageous in that they have good hardness and a good consistency at the operating temperatures, satisfactory mechanical properties, notably good elasticity, and they have, at the application temperatures, a viscosity similar to that of conventional bitumens of the same grade.

The bituminous compositions according to the invention are advantageous in that they are solid at ambient temperature and allow the bitumen to be placed in divided form, notably in the form of pellets or blocks. These bituminous compositions that are solid at ambient temperature and in divided form also make it possible to prevent, reduce and/or retard the adhesion and/or agglomeration of the pellets or blocks during their transportation and/or storage and/or handling at ambient temperature, notably at elevated ambient temperature, over long periods, when compared with the bitumen-based materials of the prior art. These bituminous compositions which are solid at ambient temperature and in divided form conserve their properties over time.

OBJECTS OF THE INVENTION

Under these circumstances, the object of the present invention is to propose novel bituminous compositions comprising a combination of the molecules of general formula (I) and of the molecules of general formula (II) and/or (III) according to the invention.

Another object of the invention is to propose bituminous compositions which have good physicochemical and mechanical properties at the operating temperatures, notably in terms of hardness, consistency, or even also elasticity, but which also preferably have a reduced viscosity at the application temperatures, or even a viscosity equivalent to that of a non-supplemented bitumen.

Another object of the invention is to propose a simple process for preparing bituminous compositions, comprising the mixture of molecules according to the invention.

Another object of the invention is to propose bituminous compositions which are solid at ambient temperature and which allow the bitumen to be placed in divided form, notably in the form of pellets or blocks.

Another object of the invention is to propose bituminous compositions that are solid at ambient temperature and in divided form, which have a good hardness and a good consistency at the operating temperatures without degrading the mechanical properties of the bitumen. Notably, it is sought to obtain compositions which have a viscosity similar to that of standard bitumens of the same grade at the application temperatures.

Another object of the invention is to propose bituminous compositions that are solid at ambient temperature and in divided form, which make it possible to prevent, reduce and/or retard the adhesion and agglomeration of the pellets or blocks during their transportation and/or storage and/or handling at ambient temperature, notably at elevated ambient temperature, over long periods while at the same time conserving their properties over time.

Another object of the invention is to propose novel molecules that are capable in particular of forming a thermoreversible network in bituminous compositions.

BRIEF DESCRIPTION

The invention is directed toward a bituminous composition comprising at least one bitumen and a mixture of at least one molecule of general formula (I):

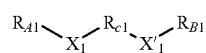

(I)

and of at least one molecule of general formula (II) and/or (III):

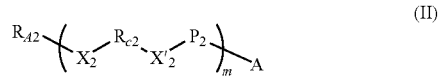

(II)

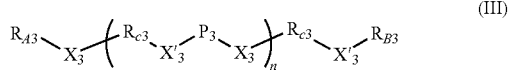

(III)

in which:
$R_{C1}$, $R_{C2}$ and $R_{C3}$, which may be identical or different, represent, independently of each other, a hydrocarbon-based chain comprising from 2 to 26 carbon atoms and optionally comprising one or more heteroatoms,
$R_{A1}$, $R_{A2}$, $R_{A3}$, $R_{B1}$ and $R_{B3}$, which may be identical or different, represent, independently of each other, a hydrocarbon-based group comprising from 4 to 200 carbon atoms and optionally comprising one or more heteroatoms,
$X_1$, $X'_1$, $X_2$, $X'_2$, $X_3$ and $X'_3$, which may be identical or different, represent, independently of each other, a chemical function chosen from urethane, urea, amide, hydrazide and oxamide functions,
$P_2$ and $P_3$, which may be identical or different, represent, independently of each other, a hydrocarbon-based group comprising from 10 to 400 carbon atoms, preferably from 20 to 250 carbon atoms, more preferably from 20 to 200 carbon atoms, and optionally comprising one or more heteroatoms,
A is the residue of a multifunctional, preferably difunctional, trifunctional or quadrifunctional, coupling agent,
n and m are integers between 1 and 20, preferably between 1 and 10, more preferably between 1 and 8, and even more preferably between 1 and 5.

Preferably, $R_{C1}$, $R_{C2}$ and $R_{C3}$, which may be identical or different, represent, independently of each other, a saturated linear aliphatic hydrocarbon-based chain.

Preferably, $R_{C1}$, $R_{C2}$ and $R_{C3}$, which may be identical or different, represent a hydrocarbon-based chain comprising from 4 to 18 carbon atoms, preferably from 4 to 14 carbon atoms, preferably from 4 to 12 carbon atoms, preferentially from 4 to 10 carbon atoms, preferentially from 4 to 8 carbon atoms.

In one variant according to the invention, $R_{A1}$, $R_{A2}$, $R_{A3}$, $R_{B1}$ and $R_{B3}$, which may be identical or different, represent a hydrocarbon-based chain comprising from 4 to 150 carbon atoms or a bitumen-soluble oligomer chosen from polyolefins, polyether oxides, polyacrylates, polymethacrylates, polysulfides, polystyrenes, polybutadienes, polyisobutenes, polyisoprenes, polyesters, polyamides, polysiloxanes, polyvinyl chlorides (PVC) and polytetrafluoroethylenes (PTFE).

Advantageously, $R_{A1}$, $R_{A2}$, $R_{A3}$, $R_{B1}$ and $R_{B3}$, which may be identical or different, represent a hydrocarbon-based chain chosen from octadecyl, oleyl, hexadecyl, tetradecyl, pentadecyl, heptadecyl, eicosyl, dodecyl, tridecyl and undecyl.

Preferably, $X_1$, $X'_1$, $X_2$, $X'_2$, $X_3$ and $X'_3$, which may be identical or different, represent, independently of each other, a urethane or urea function. Preferably, $P_2$ and $P_3$, which may be identical or different, represent a saturated linear hydrocarbon-based chain.

The bituminous composition according to the invention advantageously comprises from 0.1% to 30% by mass of the mixture of the molecule of general formula (I) and of the molecule of general formula (II) and/or (III), preferably from 0.5% to 20%, preferably from 1% to 10%, more preferably from 2% to 10%, even more preferably from 2% to 5% by mass relative to the total mass of the bituminous composition.

The invention also relates to the use of the mixture of the molecule of general formula (I) and of the molecule of general formula (II) and/or (III), for preparing bituminous compositions, advantageously bituminous compositions that are in solid form at ambient temperature and in divided form.

The invention is directed in particular toward a process for preparing a bituminous composition, which comprises the following steps:
  providing a bituminous binder comprising at least one bitumen,
  placing the molecule of general formula (I) and the molecule of general formula (II) and/or (III), at a temperature of between 70 and 220° C., preferably between 90 and 180° C., preferably between 110 and 180° C., in contact with the bituminous binder, and then optionally
  placing the bituminous composition in divided form, and in particular in the form of blocks or pellets.

Preferably, the bitumen is chosen from bitumens of natural origin, from bitumens obtained from the refining of crude oil such as atmospheric distillation residues, vacuum distillation residues, visbroken residues, blown residues, mixtures thereof and combinations thereof or from synthetic bitumens.

The invention is also directed toward a bituminous composition that is solid at ambient temperature and in divided form.

According to a preferred embodiment, said bituminous composition is in the form of pellets or blocks.

Another aspect of the invention is directed toward a process for transporting and/or storing and/or handling the bituminous composition, said bituminous composition being transported and/or stored and/or handled at ambient temperature in divided and solid form, notably in the form of solid blocks or pellets.

The invention also relates to the use of the bituminous composition which is solid at ambient temperature and preferably in divided form, in the fields of road applications, notably in the manufacture of road binders, surfacing mixes and roadways in general, and in the fields of industrial applications.

The invention is also directed toward a mixture of molecules comprising:
  at least one molecule of general formula (I):

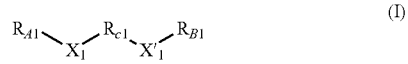

and at least one molecule of general formula (II) and/or (III):

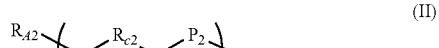

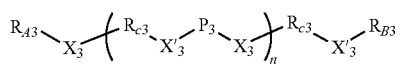

in which:
  $R_{C1}$, $R_{C2}$ and $R_{C3}$, which may be identical or different, represent, independently of each other, a hydrocarbon-based chain comprising from 2 to 26 carbon atoms and optionally comprising one or more heteroatoms,
  $R_{A1}$, $R_{A2}$, $R_{A3}$, $R_{B1}$ and $R_{B3}$, which may be identical or different, represent, independently of each other, a hydrocarbon-based group comprising from 4 to 200 carbon atoms and optionally comprising one or more heteroatoms,
  $X_1$, $X'_1$, $X_2$, $X'_2$, $X_3$ and $X'_3$, which may be identical or different, represent, independently of each other, a chemical function chosen from urethane, urea, amide, hydrazide and oxamide functions,
  $P_2$ and $P_3$, which may be identical or different, represent, independently of each other, a hydrocarbon-based group comprising from 10 to 400 carbon atoms, preferably from 20 to 250 carbon atoms, more preferably from 20 to 200 carbon atoms, and optionally comprising one or more heteroatoms,
  A is the residue of a multifunctional, preferably difunctional, trifunctional or quadrifunctional, coupling agent,
  n and m are integers between 1 and 20, preferably between 1 and 10, more preferably between 1 and 8, and even more preferably between 1 and 5.

Finally, the invention is directed toward a kit comprising, in at least two separate housings of the same packaging:
  at least one molecule of general formula (I):

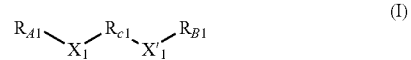

and at least one molecule of general formula (II) and/or (III):

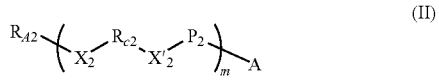

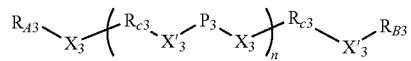

as defined above and as detailed below,
and optionally a bitumen base.

The invention also relates to the use of the bituminous compositions and of the kits as defined above and as detailed below, in the fields of road applications, optionally as a mixture with recycled bituminous surfacing mix aggregates, notably for manufacturing a surface dressing, a hot surfacing mix, a cold surfacing mix, a cold-cast surfacing mix, a gravel emulsion, a base course, a tie course, a tack course, a surface course, a rut-resistant course, a draining surfacing mix, or an asphalt, and in the fields of industrial applications, notably for preparing a sealing covering or an impregnation membrane or coat.

DETAILED DESCRIPTION

The expression "between X and Y" includes the limits, unless explicitly mentioned otherwise. This expression thus means that the targeted range comprises the values X and Y and all the values ranging from X to Y.

The term "oligomer" means a macromolecule consisting of a limited number of repeating units. These repeating units may all be identical or an oligomer may comprise different repeating units. Generally, an oligomer comprises from 2 to 100 repeating units and an average molar mass of greater than or equal to 200 g/mol and less than or equal to 20 000 g/mol, preferably less than or equal to 10 000 g/mol.

The Bituminous Composition According to the Invention and the Process for Preparing Same The Bituminous Composition The bituminous compositions according to the invention comprise at least one bitumen and a mixture:
of at least one molecule of general formula (I):

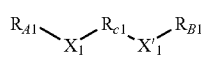

(I)

and of at least one molecule of general formula (II) and/or (III):

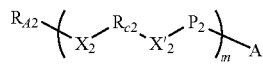

(II)

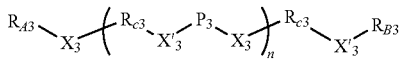

(III)

in which:
$R_{C1}$, $R_{C2}$ and $R_{C3}$, which may be identical or different, represent, independently of each other, a hydrocarbon-based chain comprising from 2 to 26 carbon atoms and optionally comprising one or more heteroatoms, $R_{A1}$, $R_{A2}$, $R_{A3}$, $R_{B1}$ and $R_{B3}$, which may be identical or different, represent, independently of each other, a hydrocarbon-based group comprising from 4 to 200 carbon atoms and optionally comprising one or more heteroatoms, $X_1$, $X'_1$, $X_2$, $X'_2$, $X_3$ and $X'_3$, which may be identical or different, represent, independently of each other, a chemical function chosen from urethane —O—(CO)—NH—, urea —HN—(CO)—NH—, amide —(CO)—NH—, hydrazide —(CO)—NH—NH— and oxamide —HN—(CO)—(CO)—NH-functions, $P_2$ and $P_3$, which may be identical or different, represent, independently of each other, a hydrocarbon-based group comprising from 10 to 400 carbon atoms, preferably from 20 to 250 carbon atoms, more preferably from 20 to 200 carbon atoms, and optionally comprising one or more heteroatoms, A is the residue of a multifunctional, preferably difunctional, trifunctional or quadrifunctional, coupling agent, n and m are integers between 1 and 20, preferably between 1 and 10, more preferably between 1 and 8, and even more preferably between 1 and 5.

According to the invention, the term "the mixture" means the mixtures of the molecules (I) and of the molecules (II) and/or (III) in all proportions.

When $R_{C1}$ and/or $R_{C2}$ and/or $R_{C3}$ comprise one or more heteroatoms, they are advantageously chosen from O, N and S.

Preferably, $R_{C1}$, $R_{C2}$ and $R_{C3}$, which may be identical or different, represent, independently of each other, a saturated linear aliphatic hydrocarbon-based chain.

Preferably, $R_{C1}$, $R_{C2}$ and $R_{C3}$, which may be identical or different, represent a hydrocarbon-based chain comprising from 4 to 18 carbon atoms, preferably from 4 to 14 carbon atoms, preferably from 4 to 12 carbon atoms, preferentially from 4 to 10 carbon atoms, preferentially from 4 to 8 carbon atoms. For example, $R_{C1}$, $R_{C2}$ and $R_{C3}$, which may be identical or different, represent a hydrocarbon-based chain comprising 4, 5, 6, 7 or 8 carbon atoms.

In a particular embodiment according to the invention, $R_{C1}$, $R_{C2}$ and $R_{C3}$ are independently chosen from the following groups: —$C_4H_8$—, —$C_5H_{10}$—, —$C_6H_{12}$—, —$C_7H_{14}$—, —$C_8H_{16}$—, —$C_9H_{18}$—, —$C_{10}H_{20}$—, —$C_{11}H_{22}$—, —$C_{12}H_{24}$—, —$C_{13}H_{26}$—, —$C_{14}H_{28}$—, —$C_{15}H_{30}$—, —$C_{16}H_{32}$—, —$C_{17}H_{34}$—, —$C_{18}H_{36}$—.

In a particular embodiment of the invention, $R_{C1}$, $R_{C2}$ and $R_{C3}$ are independently chosen from the following groups: —$C_4H_8$—, —$C_6H_{12}$—, —$C_8H_{16}$—, —$C_{10}H_{20}$—, —$C_{12}H_{24}$—, —$C_{14}H_{28}$—, —$C_{16}H_{32}$—, —$C_{18}H_{36}$—.

In another particular embodiment according to the invention, $R_{C1}$, $R_{C2}$ and $R_{C3}$ are independently chosen from the following groups: —$C_6H_{12}$—, —$C_8H_{16}$—, —$C_{10}H_{20}$—, —$C_{12}H_{24}$—, —$C_{14}H_{28}$—; preferably from the following groups: —$C_6H_{12}$—, —$C_8H_{16}$—, —$C_{10}H_{20}$—, —$C_{12}H_{24}$—; more preferably from the following groups: —$C_6H_{12}$—, —$C_8H_{16}$—, —$C_{10}H_{20}$—.

The hydrocarbon-based groups $R_{A1}$, $R_{A2}$, $R_{A3}$, $R_{B1}$ and $R_{B3}$, which may be identical or different, are advantageously chosen from:
linear or branched, saturated or unsaturated, acyclic or cyclic, aliphatic or aromatic hydrocarbon-based chains, comprising from 4 to 200 carbon atoms and optionally comprising one or more heteroatoms,
bitumen-soluble oligomers comprising from 4 to 200 carbon atoms and optionally comprising one or more heteroatoms.

When one or more of the groups $R_{A1}$, $R_{A2}$, $R_{A3}$, $R_{B1}$ and $R_{B3}$ comprise one or more heteroatoms, they are advantageously chosen from O, N, S, Si, and halogens, notably F and Cl.

In one variant according to the invention, $R_{A1}$, $R_{A2}$, $R_{A3}$, $R_{B1}$ and $R_{B3}$, which may be identical or different, represent a linear or branched, saturated or unsaturated, acyclic or cyclic, aliphatic or aromatic hydrocarbon-based chain comprising from 4 to 150 carbon atoms, preferably from 4 to 100 carbon atoms, preferably from 4 to 68 carbon atoms, preferably from 10 to 54 carbon atoms, preferentially from 10 to 36 carbon atoms.

Preferably, according to this variant, $R_{A1}$, $R_{A2}$, $R_{A3}$, $R_{B1}$ and $R_{B3}$, which may be identical or different, comprise from 10 to 36 carbon atoms, more preferentially from 16 to 20 carbon atoms.

Advantageously, according to this variant, $R_{A1}$, $R_{A2}$, $R_{A3}$, $R_{B1}$ and $R_{B3}$, which may be identical or different, represent a hydrocarbon-based chain chosen from octadecyl, oleyl, hexadecyl, tetradecyl, pentadecyl, heptadecyl, eicosyl, dodecyl, tridecyl and undecyl.

Advantageously, according to another variant, $R_{A1}$, $R_{A2}$, $R_{A3}$, $R_{B1}$ and $R_{B3}$, which may be identical or different, represent a bitumen-soluble oligomer. Advantageously, according to this variant, $R_{A1}$, $R_{A2}$, $R_{A3}$, $R_{B1}$ and $R_{B3}$, which may be identical or different, are chosen from polyolefins such as polyethylene (PE), polypropylene (PP), polyethylene butylene (PEB), polyisobutene; polyether oxides such as polyethylene glycol (PEG), polypropylene glycol (PPG), polytetramethyl oxide (PTMO); polyacrylates and polymethacrylates such as polymethyl methacrylate (PMMA), le polybutyl acrylate (PABu); polysulfides; polystyrenes such as polystyrene (PS); polybutadienes and polyisoprenes; polyesters such as poly-ε-caprolactone (PCL), polylactic acid (PLA); polyamides; polysiloxanes and halogenated polymers such as polyvinyl chloride (PVC), polytetrafluoroethylene (PTFE).

Preferably, $X_1$, $X'_1$, $X_2$, $X'_2$, $X_3$ and $X'_3$, which may be identical or different, represent, independently of each other, a urethane or urea function.

Advantageously, in the molecule of general formula (I), $X_1$ and $X'_1$ are identical and represent a urea function.

Advantageously, in the molecule of general formula (II), $X_2$ and $X'_2$ are identical and represent a urea function or a urethane function.

Advantageously, in the molecule of general formula (III), $X_3$ and $X'_3$ are identical and represent a urea function or a urethane function.

The hydrocarbon-based groups $P_2$ and $P_3$ of the molecules of general formula (II) or (III) are advantageously a hydrocarbon-based chain comprising from 10 to 400 carbon atoms, preferably from 20 to 250 carbon atoms, more preferably from 20 to 200 carbon atoms, even more preferably from 20 to 50 carbon atoms, and optionally comprising one or more heteroatoms.

When $P_2$ and/or $P_3$ comprise one or more heteroatoms, they are advantageously chosen from O, N and S.

The functional residue A is a coupling agent residue. Use may be made of any polymer coupling agent known to those skilled in the art which is capable of connecting the groups $P_2$ and $P_3$ to the cohesive blocks. Examples that may be mentioned include ethylene glycol, glycerol, pentaerythritol, triethylenetetramine, etc. The functional residue A is preferably a trifunctional or quadrifunctional residue, preferably a trifunctional residue.

The molecule of formula (I) according to the invention may be described as comprising a central segment and two outer segments ($R_{A1}$, $R_{A2}$, $R_{A3}$, $R_{B1}$, $R_{B3}$) connected to the central segment via a chemical function ($X_1$, $X'_1$, $X_2$, $X'_2$, $X_3$, $X'_3$). In the present description, the central segment comprising the chemical functions $X_1$, $X'_1$, $X_2$, $X'_2$, $X_3$, $X'_3$ may also be called a cohesive block.

The molecules of formula (II) or (III) comprise cohesive blocks connected via the group $P_2$ or $P_3$.

For clearer comprehension of the description of the molecules of general formula (I) and of the molecules of formula (II) or (III), they may be illustrated by a simplified schematic formalism. The key to this formalism is presented as follows:

● represents the function $X_1$, $X'_1$, $X_2$, $X'_2$, $X_3$ or $X'_3$

▨ represents the group $R_{C1}$, $R_{C2}$ or $R_{C3}$

— represents the group $R_{A1}$, $R_{A2}$, $R_{A3}$, $R_{B1}$ or $R_{B3}$

∿ represents $P_2$ or $P_3$

Thus, the molecule of formula (I) may be represented in the following manner:

In the molecule of formula (III), the integer n may range between 1 and 20, preferably between 1 and 10, more preferably between 1 and 8, and even more preferably between 1 and 5. When n=1, the molecule of formula (III) may thus be represented in the following manner:

In the molecule of formula (III), when n=2, the molecule of formula (III) may thus be represented in the following manner:

In the molecule of formula (III), when n=3, the molecule of formula (III) may thus be represented in the following manner:

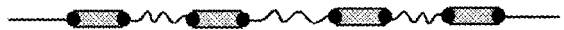

In the molecule of formula (II), when A is a trifunctional coupling agent residue, the integer m may range between 1 and 20, preferably between 1 and 10, more preferably between 1 and 8, and even more preferably between 1 and 5.

In the case where A is a trifunctional coupling agent residue, and when m=1, the molecule of formula (II) may thus be represented in the following manner:

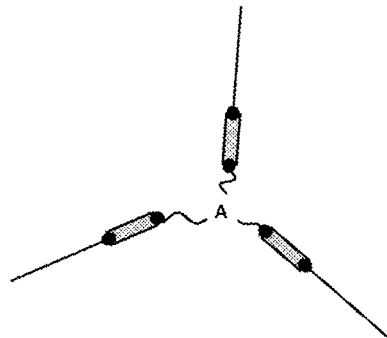

In the case where A is a trifunctional coupling agent residue, and when m=2, the molecule of formula (II) may thus be represented schematically in the following manner:

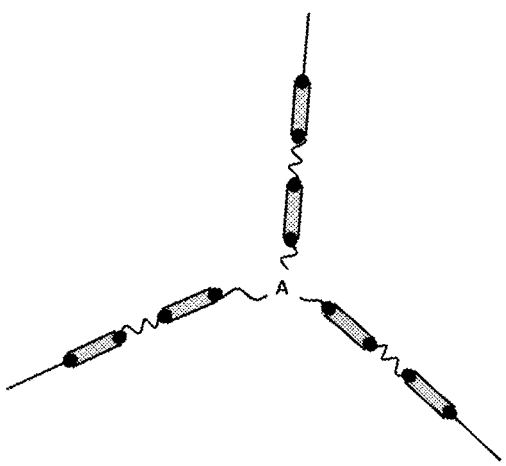

In the case of the last two molecules, the trifunctional residue A serves as a coupling agent for at least three parts of the group $P_2$ or $P_3$.

According to one embodiment, the molecule of formula (I) according to the invention has a molar mass of less than 20 000 g·mol$^{-1}$, preferably between 100 and 10 000 g·mol$^{-1}$. Preferably, the molecule of formula (I) according to the invention has a molar mass of between 100 and 2000 g·mol$^{-1}$, preferably between 100 and 1000 g·mol$^{-1}$, more preferably between 100 and 500 g·mol$^{-1}$.

According to another embodiment, the molecule of formula (II) or (III) according to the invention has a molar mass of less than 200 000 g·mol$^{-1}$, preferably between 100 and 100 000 g·mol$^{-1}$. Preferably, the molecule of formula (II) or (III) according to the invention has a molar mass of between 500 and 50 000 g·mol$^{-1}$, preferably between 500 and 20 000 g·mol$^{-1}$.

The mixtures of molecules of formula (I), and of molecules (II) and/or (III) according to the invention have the advantage of having organogelling properties. For the purposes of the invention, the term "organogelling agent" or "organogelling molecule" means a compound that is capable of establishing an association between several molecules of identical or different chemical structure to form a supramolecular network. In bitumen, these "organogelling" molecules are capable of establishing between themselves physical interactions leading to self-aggregation with formation of a 3D supramolecular network which is responsible for the gelling of the bitumen. Stacking of the molecules allows the formation of a network of fibrils, which immobilize the bitumen molecules. The formation of fibrils may be observed, for example, by polarized light microscopy, by scanning electron microscopy (SEM), etc.

The molecules of formulae (I), (II) and (III) according to the invention comprise a central segment comprising functions that are capable of creating hydrogen bonds. Said central segment is bonded to outer segments ($R_{A1}$, $R_{A2}$, $R_{A3}$, $R_{B1}$ or $R_{B3}$) making it possible to promote the solubility of the molecule (I), (II) or (III) in the bitumen. At the operating temperatures, ranging from −20 to 80° C., the molecules of formula (I), (II) or (III) bond together non-covalently, notably via hydrogen bonds. These hydrogen bonds are weakened when the bitumen is heated to high temperature. Thus, at the operating temperatures, the assembly consisting of a large number of molecules of formula (I), (II) or (III) may be likened to a "supramolecular" polymer and gives the bitumen thus modified improved properties. At the operating temperatures, the gelation due to the aggregation of the molecules according to the invention causes thickening of the bituminous medium, leading to an increase in hardness, which enables the bituminous compositions according to the invention to be solid at ambient temperature. The hardness of these supplemented bituminous compositions, at the operating temperatures, is increased relative to the non-supplemented starting bitumen. When the bituminous composition is heated, the interactions between the molecules (I), (II) and/or (III) are weakened, and the bitumen regains the properties of a non-supplemented bitumen: the viscosity of the hot bituminous composition once again becomes that of the starting bitumen. This phenomenon is also described in the present invention by the term "thermoreversible network".

Preferably, the bitumen compositions according to the invention consist essentially:
  a) of bitumen,
  b) of a mixture comprising at least one compound of formula (I) and at least one compound chosen from those of formulae (II) and/or (III) as defined above.

According to a first advantageous variant, the pellets according to the invention comprise, and preferably consist essentially of:
  a) 70% to 99.9% of bitumen,
  b) 0.1% to 30% of a mixture comprising at least one compound of formula (I) and at least one compound chosen from those of formulae (II) and/or (III) as defined above.

According to a second advantageous variant, the pellets according to the invention comprise, and preferably consist essentially of:
  a) 70% to 99% of bitumen,
  b) 0.1% to 30% of a mixture comprising at least one compound of formula (I) and at least one compound chosen from those of formulae (II) and/or (III) as defined above,
  c) one or more anticaking agents as defined below,
  d) one or more olefinic polymer adjuvants as defined below.

Process for Preparing the Bituminous Composition

The bituminous compositions according to the invention comprise at least one bitumen and a mixture of at least one molecule of general formula (I) and of at least one molecule of general formula (II) and/or (III).

The bituminous compositions according to the invention advantageously comprise from 0.1% to 30% by mass of the mixture of the molecule of general formula (I) and of the molecule of general formula (II) and/or (III), preferably from 0.5% to 20%, preferably from 1% to 10%, more preferably from 2% to 10%, even more preferably from 2% to 5% by mass relative to the total mass of the bituminous composition.

Advantageously, the mass ratio of the molecule of general formula (I) to the molecule of general formula (II) and/or (III) is at least 1:1, preferably at least 1.5:1, preferably at least 1.7:1, preferably at least 2:1.

The process for preparing the bituminous composition according to the invention advantageously comprises the following steps:
  providing a bituminous binder comprising at least one bitumen,
  placing the molecule of general formula (I) and the molecule of general formula (II) and/or (III), at a temperature of between 70 and 220° C., preferably between 90 and 180° C., preferably between 110 and 180° C., in contact with the bituminous binder, and then optionally placing the bituminous composition in divided form, and in particular in the form of blocks or pellets.

The term "bituminous binder" means a single bitumen, optionally comprising additives such as a polymer and/or a fluxing agent. The bituminous binder may be in anhydrous form or in emulsion form.

In one embodiment, the process for preparing the bituminous compositions according to the invention comprises the following steps:
a) a bitumen is introduced into a container equipped with mixing means, and the bitumen is brought to a temperature of between 70 and 220° C., preferably between 90 and 180° C., preferably between 110 and 180° C.,
b) the molecules of general formulae (I), (II) and/or (III) and optionally additives are introduced,
c) the bituminous composition obtained from step b) is heated to a temperature of between 70 and 220° C., preferably between 90 and 180° C., preferably between 110 and 180° C., with stirring, until a bituminous composition which is advantageously homogeneous is obtained,
d) the bituminous composition obtained from step c) is optionally placed in divided form, and in particular in the form of blocks or pellets.

The Bitumen Base

The bituminous compositions according to the invention may contain bitumens obtained from various origins. Among the bitumens that may be used according to the invention, mention may be made firstly of bitumens of natural origin, those contained in deposits of natural bitumen, of natural asphalt or bituminous sands and bitumens obtained from the refining of crude oil. The bitumens according to the invention are advantageously chosen from bitumens obtained from the refining of crude oil. The bitumens may be chosen from bitumens or bitumen mixtures obtained from the refining of crude oil, in particular bitumens containing asphaltenes or pitches. The bitumens may be obtained via conventional bitumen manufacturing processes in a refinery, in particular by direct distillation and/or vacuum distillation of oil. These bitumens may optionally be visbroken and/or deasphalted and/or air-rectified. It is common practice to perform vacuum distillation of the atmospheric residues obtained from the atmospheric distillation of crude oil. This manufacturing process consequently corresponds to the succession of an atmospheric distillation and a vacuum distillation, the feedstock feeding the vacuum distillation corresponding to the atmospheric residues. These vacuum residues obtained from the vacuum distillation tower may also be used as bitumens. It is also common practice to inject air into a feedstock usually composed of distillates and of heavy products obtained from the vacuum distillation of atmospheric residues obtained from the distillation of oil. This process makes it possible to obtain a blown or semi-blown or oxidized or air-rectified or partially air-rectified base. The various bitumens or bitumen bases obtained by means of the refining processes may be combined together to obtain the best technical compromise. The bitumen may also be a recycled bitumen. The bitumens may be hard-grade or soft-grade bitumens.

Advantageously, the bitumen is chosen from bitumens of natural origin, from bitumens obtained from the refining of crude oil such as atmospheric distillation residues, vacuum distillation residues, visbroken residues, blown residues, mixtures thereof and combinations thereof or from synthetic bitumens, also known as clear binders.

In a particular embodiment according to the invention, the bitumen may also comprise at least one polymer and/or one fluxing agent.

As examples of bitumen polymers, mention may be made of elastomers such as SB, SBS, SIS, SBS*, SBR, EPDM copolymers, polychloroprene and polynorbornene and optionally polyolefins such as polyethylenes PE, PEHD, polypropylene PP, plastomers such as EVA, EMA, copolymers of olefins and of EBA unsaturated carboxylic esters, polyolefin elastomer copolymers, polybutene-type polyolefins, copolymers of ethylene and of acrylic or methacrylic acid esters or of maleic anhydride, copolymers and terpolymers of ethylene and of glycidyl methacrylate, ethylene-propylene copolymers, rubbers, polyisobutylenes, SEBSs and ABSs.

Other additives may also be added to the bitumen according to the invention. These are, for example, vulcanizing agents and/or crosslinking agents that are capable of reacting with a polymer, when it is an elastomer and/or a plastomer, which may be functionalized and/or which may include reactive sites.

Among the vulcanizing agents, mention may be made of those based on sulfur and derivatives thereof, used for crosslinking an elastomer in contents of from 0.01% 20 to 30% by mass relative to the mass of elastomer.

Among the crosslinking agents, mention may be made of cationic crosslinking agents such as monocarboxylic or polycarboxylic acids or anhydrides, carboxylic acid esters, sulfonic, sulfuric or phosphoric acids, or even the acid chlorides, and phenols, in contents of from 0.01% to 30% by mass relative to the mass of polymer. These agents are capable of reacting with the functionalized elastomer and/or plastomer. They can be used in addition to or in replacement for the vulcanizing agents.

According to one embodiment, the bituminous composition according to the invention may also comprise an olefinic polymer adjuvant.

The olefinic polymer adjuvant is preferably chosen from the group consisting of (a) ethylene/glycidyl (meth)acrylate copolymers and (b) ethylene/monomer A/monomer B terpolymers:
(a) The ethylene/glycidyl (meth)acrylate copolymers are advantageously chosen from statistical or block, preferably statistical, copolymers of ethylene and of a monomer chosen from glycidyl acrylate and glycidyl methacrylate, comprising from 50% to 99.7% by mass, preferably from 60% to 95% by mass and more preferentially from 60% to 90% by mass of ethylene,
(b) The terpolymers are advantageously chosen from statistical or block, preferably statistical, terpolymers of ethylene, of a monomer A and of a monomer B.

The monomer A is chosen from vinyl acetate and C1 to C6 alkyl acrylates or methacrylates.

The monomer B is chosen from glycidyl acrylate and glycidyl methacrylate.

The ethylene/monomer A/monomer B terpolymers advantageously comprise from 0.5% to 40% by mass, preferably from 5% to 35% by mass, more preferentially from 10% to 30% by mass of units derived from the monomer A, and from 0.5% to 15% by mass, preferably from 2.5% to 15% by mass of units derived from the monomer B, the remainder being formed from units derived from ethylene.

Advantageously, the olefinic polymer adjuvant is chosen from statistical terpolymers of ethylene (b), of a monomer A chosen from C1 to C6 alkyl acrylates or methacrylates and of a monomer B chosen from glycidyl acrylate and glycidyl methacrylate, comprising from 0.5% to 40% by mass, preferably from 5% to 35% by mass, more preferentially from 10% to 30% by mass of units derived from the monomer A, and from 0.5% to 15% by mass, preferably from 2.5% to 15% by mass of units derived from the monomer B, the remainder being formed from units derived from ethylene.

According to one embodiment, the bituminous composition which is solid at ambient temperature and preferably in divided form may comprise from 0.05% to 15% by mass, preferably from 0.1% to 10% by mass and more preferentially from 0.5% to 6% by mass of the olefinic polymer adjuvant relative to the total mass of the bituminous composition according to the invention.

According to a particular embodiment, the bituminous composition which is solid at ambient temperature and preferably in divided form may also comprise between 0.5% and 20% by mass, preferably between 2% and 20% by mass and more preferentially between 4% and 15% by mass of anticaking agent relative to the total mass of said pellets or said blocks according to the invention.

The term "anticaking agent" or "anticaking compound" means any compound which limits, reduces, inhibits or retards the agglomeration and/or adhesion of the pellets with each other during their transportation and/or storage at ambient temperature and which ensures their fluidity during their handling.

Preferably, the anticaking compound is chosen from: talc; fines generally with a diameter of less than 125 µm, such as siliceous fines, with the exception of limestone fines; sand such as Fontainebleau sand; cement; carbon; wood residues such as lignin, lignosulfonate, conifer needle powders, conifer cone powders, notably of pine; rice ball ash; glass powder; clays such as kaolin, bentonite, vermiculite; alumina such as hydrated alumina; silica; silica derivatives such as fumed silicas, functionalized fumed silicas, notably hydrophobic or hydrophilic fumed silicas, pyrogenic silicas, notably hydrophobic or hydrophilic pyrogenic silicas, silicates, silicon hydroxides and silicon oxides; plastic powder; lime; hydrated lime; plaster; rubber crumb; polymer powder, such as powders of styrene-butadiene (SB) copolymers, of styrene-butadiene-styrene (SBS) copolymers, and mixtures of these materials.

Advantageously, the anticaking agent is chosen from talc, fines generally with a diameter of less than 125 µm with the exception of limestone fines, such as siliceous fines; wood residues such as lignin, lignosulfonate, conifer needle powders, conifer cone powders, notably of pine; glass powder; sand such as Fontainebleau sand; fumed silicas, notably hydrophobic or hydrophilic fumed silicas; pyrogenic silicas, notably hydrophobic or hydrophilic pyrogenic silicas; and mixtures thereof.

Forming of the Bituminous Compositions According to the Invention

According to a particular embodiment, the bituminous composition according to the invention is solid at ambient temperature and in divided form. According to a preferred embodiment, the bituminous composition according to the invention is in the form of pellets or blocks.

The pellets according to the invention are obtained by forming the bituminous composition according to the invention as described above according to any known process, for example according to the manufacturing process described in U.S. Pat. No. 3,026,568, WO 2009/153324 or WO 2012/168380. Use may notably be made of the methods described in patent application WO 2018/104660.

According to a particular embodiment, the forming of the pellets may be performed by draining, in particular using a drum.

Other techniques may be used in the process for manufacturing the pellets, in particular molding, extrusion, etc.

The block according to the invention may be manufactured according to any known process, for example according to the manufacturing process described in US 2011/0290695.

Composition that is Solid at Ambient Temperature and in the Form of Pellets According to the Invention According to one embodiment, the bituminous composition according to the invention is in the form of pellets.

The pellets according to the invention may have, within the same population of pellets, one or more shapes chosen from a cylindrical, spherical or ovoid shape. The pellets according to the invention preferably have a cylindrical or spherical shape.

According to one embodiment of the invention, the size of the pellets according to the invention is such that the average longest size is preferably less than or equal to 50 mm, more preferentially from 3 to 30 mm, even more preferentially between 5 and 20 mm. For example, the use of a die makes it possible to control the manufacture of pellets of a chosen size. Screening makes it possible to select pellets as a function of their size.

Preferably, the pellets according to the invention have a weight of between 0.1 g and 50 g, preferably between 0.2 g and 10 g, more preferentially between 0.2 g and 5 g.

According to another embodiment of the invention, the size of the pellets according to the invention is such that the average longest size is preferably less than or equal to 20 mm, more preferentially less than or equal to 10 mm, even more preferentially less than or equal to 5 mm.

According to a particular embodiment, the bituminous composition which is solid at ambient temperature and in divided form according to the invention, preferably in the form of pellets, is covered over at least part of its surface, or even all of its surface, with an anticaking agent preferably of mineral or organic origin, more preferentially of mineral origin.

In such a case, the mass of the anticaking agent covering at least part of the surface of the pellets is advantageously between 0.2% and 10% by mass, preferably between 0.5% and 8% by mass, more preferentially between 0.5% and 5% relative to the total mass of said pellets according to the invention.

Preferably, according to this embodiment, the anticaking compound covers at least 50% of the surface of the pellets, preferably at least 60%, preferentially at least 70%, more preferentially at least 80% and even more preferentially at least 90%.

The anticaking agent is as defined above in the description. According to one variant, the anticaking compound used for covering at least part of the surface of the pellets is chosen from the mixture of molecules of formula (I) and the molecules of formulae (II) and/or (III) defined above, advantageously in powder form.

Preferably also, the mean thickness of the anticaking layer is preferably greater than or equal to 20 µm, more preferentially between 20 and 100 µm.

According to one embodiment of the invention, the anticaking agent included in the pellets may be identical to or different from the anticaking agent covering at least part of the surface of said pellets.

Composition that is Solid at Ambient Temperature and in the Form of Blocks According to the Invention According to one embodiment, the bituminous composition according to the invention is in the form of a block. The term "block" means a block of the bituminous composition having a mass of between 0.1 kg and 1000 kg, preferably between 1 kg and 200 kg, more preferentially between 1 kg and 50 kg, even more preferentially between 5 kg and 35 kg, even more preferentially between 10 kg and 30 kg, said block advantageously being parallelepipedal, preferably being a slab.

The block according to the invention preferably has a volume of between 100 cm$^3$ and 50 000 cm$^3$, preferably between 5000 cm$^3$ and 25 000 cm$^3$, more preferentially between 10 000 cm$^3$ and 30 000 cm$^3$, even more preferentially between 140 00 cm$^3$ and 25 000 cm$^3$.

When the block according to the invention is handled manually by one person, the mass of said block may range from 1 to 20 kg, and from 20 to 50 kg in the case of handling by two people. When the handling is performed by mechanical equipment, the mass of the block may range from 50 to 1000 kg.

The block according to the invention may be manufactured according to any known process, for example according to the manufacturing process described in US 2011/0290695.

The block according to the invention is advantageously wrapped in a hot-melt film put in place according to any known process, preferably with a polypropylene or polyethylene film or a mixture of polyethylene and polypropylene. The bituminous composition packaged as a bitumen block wrapped in a hot-melt film has the advantage of being ready to use, i.e. the bitumen block may be heated directly in the melting vessel or optionally introduced directly into the paving machine for manufacturing road surfacing mixes, without being unwrapped beforehand. The hot-melt film which melts with the bituminous composition according to the invention does not affect its properties.

According to one embodiment, the block according to the invention may also be packaged in cardboard packaging according to any known process.

In particular, the block according to the invention is packaged in cardboard packaging by pouring the hot bituminous composition according to the invention into cardboard packaging of which the wall of the inner face is silicone-coated and then cooled, the dimensions of the cardboard packaging being suited to the weight and/or volume of the desired block according to the invention.

When the block according to the invention is wrapped in a hot-melt film or is packaged in cardboard packaging, the Applicant has demonstrated that the deterioration of said hot-melt film or of said cardboard packaging during the transportation and/or storage at ambient temperature and even at elevated ambient temperature of said block did not cause any creep of the block according to the invention. Consequently, the blocks according to the invention keep their initial shape and do not stick together during their transportation and/or storage at high elevated temperature even if the hot-melt film or the cardboard packaging is damaged.

Without wishing to be bound to any theory, the Applicant estimates that the absence of creep of the bituminous composition which is solid at ambient temperature and in the form of pellets or blocks during its transportation and/or storage at ambient temperature, in particular elevated ambient temperature, is due to the formulation of the bituminous composition according to the invention and notably to the synergism of action of the combination of at least one molecule of general formula (I) and of at least one molecule of general formula (II) and/or (II) according to the invention in the bituminous composition.

Process for Transporting and/or Storing and/or Handling the Bituminous Composition which is Solid at Ambient Temperature and in Divided Form According to the Invention The invention also relates to a process for transporting and/or storing and/or handling the bituminous composition, said bituminous composition being transported and/or stored and/or handled at ambient temperature in divided and solid form, notably in the form of solid blocks or pellets.

Preferably, said bituminous composition which is solid at ambient temperature and in divided form according to the invention is transported and/or stored and/or handled at an ambient temperature, notably at an elevated ambient temperature, for a time of greater than or equal to 2 months, preferably 3 months.

The term "ambient temperature" means the operating temperature of the bitumen, it being understood that the ambient temperature implies that no heat is supplied other than that resulting from the climatic conditions.

Thus, the ambient temperature may reach high values, below 100° C. during summer periods, in particular in geographical regions with a warm climate.

Preferably, the ambient temperature is less than 100° C. Advantageously, the ambient temperature is from 20° C. to 50° C., preferably from 25° C. to 50° C., preferably from 25° C. to 40° C.

Advantageously, the elevated ambient temperature is from 40° C. to 90° C., preferably from 50° C. to 85° C., even more preferentially from 50° C. to 75° C., even more preferentially from 50° C. to 60° C.

The bituminous compositions which are solid at ambient temperature and in divided form according to the present invention are noteworthy in that they are solid at ambient temperature and thus easy to handle, even at elevated ambient temperatures. The bituminous compositions which are solid at ambient temperature and in divided form according to the present invention also enable the transportation and/or storage and/or handling of said pellets or blocks at ambient temperature under optimum conditions, in particular without said pellets or blocks undergoing creep during their transportation and/or storage and/or handling, even when the ambient temperature is high, and without degrading the properties of said bituminous composition, or indeed even improving them.

Use of the Bituminous Compositions According to the Invention

Various uses of the bituminous compositions according to the invention are envisioned in the fields of road applications, notably in the manufacture of road binders, surfacing mixes and roadways in general, and in the fields of industrial applications.

It may be envisioned to use the bituminous composition which is solid at ambient temperature, notably in divided form, according to the invention in various road applications, optionally as a mixture with aggregates for manufacturing a surface dressing, a hot surfacing mix, a cold surfacing mix, a cold-cast surfacing mix, a gravel emulsion, a base course, a tie course, a tack course or a surface course. These applications are notably directed toward bituminous surfacing mixes as materials for the construction and maintenance of roadways and their surfacing, and also for performing roadworks of all types. Mention may be made of other combinations of the bituminous composition and of the aggregate having particular properties, such as rut-resistant courses, draining surfacing mixes, or asphalts (mixture between a bituminous binder and aggregates such as sand).

It may be envisioned to use the bituminous composition which is solid at ambient temperature, notably in divided form according to the invention, in various industrial applications. In the industrial applications, mention may be made of its use for preparing a sealing coating, or an impregnation membrane or coat.

The bitumen pellets according to the invention are particularly suitable for manufacturing sealing membranes, noise-cancelling membranes, insulating membranes, surface coverings, carpet tiles or impregnation coats.

Process for Manufacturing Surfacing Mixes

The invention also relates to a process for manufacturing surfacing mixes comprising at least the bituminous composition which is solid at ambient temperature, notably in divided form according to the invention, and aggregates, or recycled bituminous surfacing mix aggregates, this process comprising at least the steps of:

heating the aggregates to a temperature ranging from 100° C. to 180° C., preferably from 120° C. to 180° C.,
mixing the aggregates with said bituminous composition in a tank such as a mixer or a mixing drum,
obtaining surfacing mixes.

The process for manufacturing surfacing mixes according to the invention advantageously does not require a step of heating the bituminous composition according to the invention before mixing with the recycled surfacing mix aggregates or the aggregates since, on contact with the mixture of hot aggregates, the bituminous composition according to the invention which is solid at ambient temperature melts.

Molecules of General Formulae (I), (II) and (III) and Preparation Thereof

The invention also relates to the mix comprising:
at least one molecule of general formula (I):

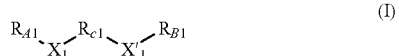 (I)

and at least one molecule of general formula (II) and/or (III):

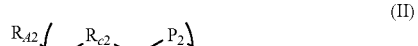 (II)

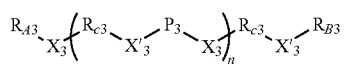 (III)

in which $R_{C1}$, $R_{C2}$, $R_{C3}$, $R_{A1}$, $R_{A2}$, $R_{A3}$, $R_{B1}$, $R_{B3}$, $X_1$, $X'_1$, $X_2$, $X'_2$, $X_3$, $X'_3$, $P_2$, $P_3$, A, n and m meet the specifications according to the invention defined earlier in the present description.

The preferential choices for the molecules of formulae (I), (II) and (III) are the same as for the bituminous composition.

Advantageously, in the mixture according to the invention, the mass ratio of the molecule of general formula (I) to the molecule of general formula (II) and/or (III) is at least 1:1, preferably at least 1.5:1, preferably at least 1.7:1, preferably at least 2:1.

The molecules of general formulae (I), (II) and (III) may be synthesized via any method known to those skilled in the art.

For the molecules of general formula (I), a diisocyanate and an outer-chain precursor may be placed in contact under conditions allowing an addition or polycondensation reaction between the reagents to form the molecule of formula (I).

For the molecules of general formula (II) or (III), a diisocyanate, the outer-chain precursors ($R_{A1}$, $R_{A2}$, $R_{A3}$, $R_{B1}$ and $R_{B3}$), the coupling agent A and the groups $P_2$ and $P_3$ may be placed in contact under conditions allowing an addition or polycondensation reaction between the reagents to form the molecule of formula (II) or (III) or a mixture thereof.

The outer-chain precursor and the groups $P_2$ and $P_3$ may be functionalized with a function chosen from alcohol, thiol or amine functions, preferably alcohol or amine functions.

For example, the outer-chain precursor may be a compound of formula $R_{Ai}$—OH, $R_{Ai}$—NH$_2$, $R_{Bj}$—OH, $R_{Bj}$—NH$_2$, (i=1, 2, 3, j=1, 3) or a mixture of these compounds.

In particular, the preparation of the molecule of formula (III) may be performed in two steps. The first consists in bonding an outer chain ($R_{A3}$) to only one end of a diisocyanate. Monofunctionalization of the isocyanate at only one end with the outer chain (unit 1) is obtained. For the first step, an excess of diisocyanate is advantageously used to ensure the monofunctionalization. The second step consists in reacting the unit 1 on the difunctionalized group $P_3$. The group $P_3$ is difunctionalized with an amine or an alcohol, preferably with an amine. The group $P_3$ reacts with the unreacted isocyanate function of the unit 1 to form, via the function $X_3$ or $X'_3$, the molecule of general formula (III).

Advantageously, the synthesis is performed in the presence of a solvent. The solvent may be chosen from organic solvents. Aprotic organic solvents will be preferred. Mention may be made of tetrahydrofuran (THF), dimethylformamide (DMF), dichloromethane, chloroform, etc.

The synthesis may be performed at a temperature of between 20 and 200° C., more preferentially between 20 and 100° C., more preferentially between 20 and 60° C., for a time which may range from 5 minutes to 24 hours, preferably between 2 hours and 8 hours.

The mole ratios between the reagents and the order of addition of said reagents are controlled to obtain the desired molecules of formulae (I), (II) and (III). The nature of the outer-chain precursor may also be controlled, as may its functionalization to obtain the desired functions $X_1$, $X'_1$, $X_2$, $X'_2$, $X_3$ and $X'_3$.

The various embodiments, variants, preferences and advantages described above for each of the objects of the invention apply to all the objects of the invention and may be taken separately or in combination.

Kit

The invention also relates to a kit comprising, in at least two separate housings of the same packaging:
at least one molecule of general formula (I),
and
at least one molecule of general formula (II) and/or (III),
and optionally
at least one bitumen base.

Advantageously, in the kit according to the invention, the mass ratio of the molecule of general formula (I) to the molecule of general formula (II) and/or (III) is at least 1:1, preferably at least 1.5:1, preferably at least 1.7:1, preferably at least 2:1.

Advantageously, in the kit according to the invention, the mixture of the molecule of general formula (I) and of the molecule of general formula (II) and/or (III) is present in respective amounts and proportions enabling the production of a supplemented bituminous composition for a predetermined amount of bitumen base, without it being necessary to weigh the components before mixing them.

The kit may comprise in the same packaging, optionally in different housings, one or more other compounds used for formulating the bituminous composition. Such a kit facilitates for users the preparation of the supplemented bituminous compositions by simplifying the weighing and/or dosing operations.

Analyses and Methods

The following analyses and methods are used for the characterization of the molecules and of the bituminous compositions according to the invention.

Fourier transform infrared spectrometry (FTIR): The infrared spectra are recorded using an Avatar FTIR 320 Is® 10 spectrometer from the company Nicolet. This machine is equipped with an ATR® (Attenuated Total Reflectance) module for analysis of the solid-state samples. When the spectrum of a solution is acquired, the transmission mode is used along with a KBr cuvette with a 0.5 mm optical path length.

Nuclear Magnetic Resonance (NMR): The $^1$H and $^{13}$C spectra are acquired on Avance 300® (300 MHz) and Ultrashield 400® (400 MHz) spectrometers from the company Brüker. The internal calibrations are performed using the residual signal of the solvent.

$A_0$: sebacic acid $A_1$—Synthesis of the molecule of formula (I) $A_1$:

The following reagents are successively introduced into a 500 mL Schlenk flask: 250 mL of dichloromethane and then 4.77 mL (5.0 g, 29.7 mmol, 1 eq) of hexamethylene diisocyanate and finally, dropwise, 24.4 mL (19.9 g, 74.3 mmol, 2.5 eq) of oleylamine. During the addition of the last reagent, an exothermic reaction takes place and a precipitate forms. After stirring for 6 hours at 40° C., the mixture is concentrated and then precipitated from 1.2 L of ethyl acetate. The white solid formed is filtered off on a sinter funnel (m=21 g, yield ~98%). The molecule $A_1$ is characterized by NMR, DSC and FTIR-ATR.

$^1$H NMR (400 MHz, chloroform-d): δ 5.35 (m, 4H), 3.21 (q, J=6.7 Hz, 8H), 2.02 (m, 8H), 1.74-1.48 (m, 8H), 1.27 (s, 52H), 0.88 (t, J=6.7 Hz, 6H).

FTIR-ATR (cm$^{-1}$): 3328, 2925, 2851, 1611, 1579.

DSC 20° C./min, from −90 to 175° C.): melting at 161° C. (80 J/g).

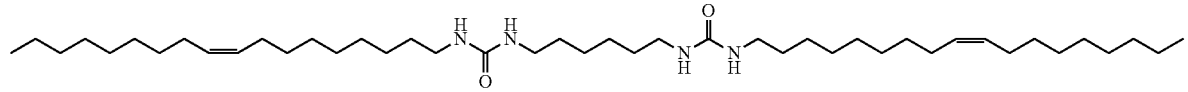 [SMILES: CCCCCCCC/C=C\CCCCCCCCNC(=O)NCCCCCCNC(=O)NCCCCCCCC/C=C\CCCCCCCC]

30

Differential scanning calorimetry (DSC): The samples are analyzed in aluminum Tzero capsules. The DSC measurements are performed on a DSC Auto Q2000® machine from TA Instruments, under a stream of nitrogen at 50 mL/min.

The invention is illustrated by the examples that follow, which are given without any implied limitation.

EXAMPLES

Materials and Methods

The rheological and mechanical characteristics of the bitumens or of the bitumen-molecule compositions to which reference is made in these examples are measured according to the methods indicated in table 1.

TABLE 1

| Property | Abbreviation | Unit | Measuring standard |
|---|---|---|---|
| Needle penetrability at 25° C. | $P_{25}$ | 1/10 mm | NF EN 1426 |
| Ring-and-ball softening point | RBSP | ° C. | NF EN 1427 |

Bitumen Base

A 70/100 grade bitumen base, denoted as $B_0$, having a penetrability $P_{25}$ of 82 1/10 mm and an RBSP of 46° C. and commercially available from Total Marketing Services is chosen.

Molecules (I) $A_1$: $R_{A1}$=$R_{B1}$=oleyl; $R_{C1}$=hexyl; $X_1$=$X'_1$=urea.

$A_2$—Synthesis of the molecule of formula (III) $A_2$:

In a round-bottomed flask, under an inert atmosphere, a solution of oleylamine (4.06 g, 5.0 mL, 14.9 mmol, 1 eq) in 60 mL of THF is added to a solution of hexamethylene diisocyanate (HDI) (10.0 g, 9.55 mL, 59.5 mmol, 4 eq) diluted beforehand in 100 mL of THF. Once the addition is complete, the mixture is stirred for 2 hours 30 minutes at room temperature. The mixture is then concentrated under reduced pressure and is precipitated from 1.5 L of hexane. The solid is filtered off and stored under argon in dry glassware. After 1 day at room temperature, the filtrate is again filtered. The solids are combined and dispersed in 120 mL of dry THF.

Hydrogenated polybutadiene, known as GI2000 ($M_n$=2400 g/mol), commercially available from Nippon Soda Co., and functionalized beforehand as diamine (17.9 g, 7.45 mmol, 0.5 eq) is diluted in 60 mL of THF. This solution is added dropwise to the prefiltered dispersion of the solid. Once the addition is complete, the solution is stirred for 1 hour at room temperature and then for 3 hours 30 minutes at 50° C. The mixture is concentrated under reduced pressure and then precipitated from 1.75 L of pentane. After stirring for 20 minutes, the mixture is left to stand. The supernatant is collected, leaving the solid at the bottom of the container. 500 mL of pentane are added with stirring and then removed again when the mixture is at rest. The white solid is then filtered off and dried under vacuum (17.6 g, yield=72%).

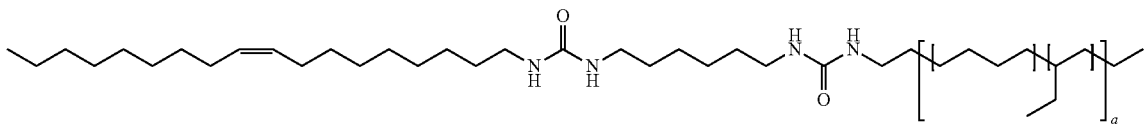

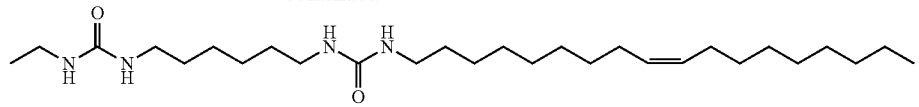

(III) A$_2$: R$_{A3}$=R$_{B3}$=oleyl; R$_{C3}$=hexyl; X$_3$=X'$_3$=urea, P$_3$=GI2000, n=1

Example 1: Preparation of the Supplemented Bituminous Compositions

The supplemented bituminous compositions are prepared by introducing into a reactor, with stirring and at 170° C., the bitumen base B$_0$ and the molecule(s) in the proportions reported in table 2 below. The mixtures are stirred and heated at 170° C. for about 30 minutes.

TABLE 2

| Composition | A$_0$ (mass %) | A$_1$ (mass %) | A$_2$ (mass %) |
|---|---|---|---|
| T$_0$ (*) | — | — | — |
| T$_1$ (*) | 5 | — | — |
| C$_1$ | — | 4 | 1 |
| C$_2$ | — | 3 | 2 |
| C$_3$ | — | 2 | 3 |
| C$_{T(A1)}$ (*) | — | 5 | — |
| C$_{T(A2)}$ (*) | — | — | 5 |

(*) comparative compositions

Results

Table 3 below presents the physical characteristics of the bituminous compositions according to the invention C$_1$, C$_2$ and C$_3$ and of the comparative compositions T$_0$, T$_1$, C$_{T(A1)}$ and C$_{T(A2)}$.

TABLE 3

| Composition | P$_{25}$ (1/10 mm) | RBSP (° C.) |
|---|---|---|
| T$_0$ (B$_0$ alone) | 82 | 46 |
| T$_1$ | 41 | 102 |
| C$_1$ | 40 | >150 |
| C$_2$ | 38.5 | >150 |
| C$_3$ | 42 | >150 |
| C$_{T(A1)}$ | 40 | >150 |
| C$_{T(A2)}$ | 52 | 106 |

The compositions according to the invention C$_1$, C$_2$ and C$_3$ have better properties than those of bitumen alone T$_0$, but also better properties than those of composition T$_1$ supplemented with 5% by mass of sebacic acid relative to the total mass of the bituminous composition. The compositions according to the invention C$_1$, C$_2$ and C$_3$ also have better properties than those of composition C$_{T(A2)}$ supplemented with only the molecule A$_2$ of formula (III) at a content of 5% by mass relative to the total mass of the bituminous composition. It is noted that the compositions according to the invention C$_1$, C$_2$ and C$_3$ have properties comparable to those of composition C$_{T(A1)}$ supplemented with only the molecule A$_1$ of formula (I) at a content of 5% by mass relative to the total mass of the bituminous composition.

An increase in the RBSP to a value ranging beyond 150° C. is noted for the compositions C$_1$, C$_2$ and C$_3$. This RBSP value is markedly higher than the RBSP values of the comparative compositions T$_1$ and C$_{T(A2)}$, which are, respectively, 102° C. and 106° C. This reflects a higher consistency of the compositions according to the invention.

The compositions according to the invention thus have a good consistency at the operating temperatures.

Example 2: Preparation of the Bitumen Blocks P$_{T0}$, P$_{T1}$, P$_{T(A1)}$, P$_{T(A2)}$, P$_1$, P$_2$ and P$_3$ Bitumen blocks P$_{T0}$, P$_{T1}$, P$_{T(A1)}$, P$_{T(A2)}$, P$_1$, P$_2$ and P$_3$ are prepared, respectively, from the control compositions T$_0$, T$_1$, C$_{T(A1)}$, C$_{T(A2)}$ and the compositions according to the invention C$_1$, C$_2$ and C$_3$. The preparation is performed according to the following method: a mass of about 0.5 kg of bitumen is poured at 160° C. into a rectangular steel mold covered with a hot-melt polyethylene film. The mold is then cooled to room temperature and then stripped.

Creep Test

A creep test is first performed. The test is performed at a temperature of 70° C. and with a shear stress of 100 Pa with an Anton Paar MCR301® shear rheometer. A module of plate-plate geometry 25 mm in diameter is used. The analysis proceeds in the following manner: the sample is crushed at 70° C. between the two plates down to a gap of 1.025 mm, the excess is leveled off and the gap is then adjusted to 1 mm (value used for the analysis). A waiting time of 10 minutes allows the sample to reach a homogeneous temperature, and the measurement then starts. FIG. 1 lists the deformation results as a function of time obtained for the various bitumen blocks.

In FIG. 1, the deformation (unitless) is reported on the y-axis and the time in seconds is reported on the x-axis. The curve as a continuous line represents that of the block P$_{T0}$. The curve as a dashed line (---) represents that of the block P$_{T1}$; the curve with circles (-o-) represents that of the block P$_{T(A2)}$; the curve with triangles (-Δ-) represents that of the block P$_{T(A1)}$; the curve with lozenges (-◊-) represents that of the block P$_1$, the curve with stars (-✦-) represents that of the block P$_2$.

A marked improvement in the creep strength of the bitumen blocks P$_1$ and P$_2$ according to the invention is observed relative to the bitumen blocks P$_{T0}$ and P$_{T1}$ supplemented with sebacic acid, and P$_{T(A2)}$ supplemented only with the molecule of formula (III). This improvement in the creep strength is also observed relative to the blocks P$_{T(A1)}$ supplemented only with the molecule of formula (I). It is noted that the blocks according to the invention have a creep strength more than 20 times greater than that of the blocks P$_{T(A1)}$ and more than 10 000 times greater than that of the blocks P$_{T(A2)}$. A synergistic effect of the combination of the molecules of formula (I) and of the molecules of formula (III) on the creep strength of the blocks according to the invention is observed.

Compressive-Stress Mechanical Strength Test

This test is performed in order to evaluate the compressive strength of each block P$_{T0}$, P$_{T1}$, P$_{T(A1)}$, P$_{T(A2)}$, P$_1$, P$_2$ and P$_3$ when it is subjected to a load and at a temperature of 50° C.

The actual compressive strength test is performed using a texture analyzer sold under the name LF Plus by the company Lloyd Instruments and equipped with a thermal chamber. To do this, a cylindrical metal box containing a mass of 60 g of bitumen block is placed inside the thermal chamber set at a temperature of 50° C. The piston of the texture analyzer is a cylinder with a diameter of 20 mm and a height of 60 mm. The cylindrical piston is placed at the start in contact with the upper surface of the bitumen block. Next, it is moved vertically downward, at a constant speed of 1 mm/min, over a calibrated distance of 10 mm so as to exert a compressive force on the upper surface of the bitumen block. The texture analyzer measures the maximum compressive force applied by the piston on the bitumen block at 50° C. Measurement of the maximum compressive force makes it possible to evaluate the capacity of the bitumen block to withstand the deformation. Thus, the greater this force, the greater will be the resistance to deformation of the bitumen block. The results are collated in table 4 below.

TABLE 4

| | Bitumen block | | | | | | |
|---|---|---|---|---|---|---|---|
| | $P_{T0}$ | $P_{T1}$ | $P_T(A_1)$ | $P_T(A_2)$ | $P_1$ | $P_2$ | $P_3$ |
| Maximum compression force (N) | 1 | 23 | 37 | 4 | 39 | 42 | 33 |

The blocks $P_1$, $P_2$ and $P_3$ according to the invention have particularly high compressive strength when compared with the control bitumen blocks $P_{T0}$ based on bitumen alone $B_0$, the bitumen blocks $P_{T1}$ based on bitumen supplemented with sebacic acid, and the bitumen blocks $P_{T(A2)}$ based on bitumen supplemented only with the molecule of formula (III).

The bitumen blocks $P_{T(A1)}$ based on bitumen supplemented only with the molecule of formula (I) have a compressive strength comparable to that of the blocks according to the invention, but a creep strength 20 times smaller than that of the blocks according to the invention (creep test).

Thus, the bitumen blocks according to the invention do not stick together and maintain their shape and consistency even at elevated ambient temperature. Thus, the transportation and/or storage are optimized for the bitumen blocks according to the invention, with safe, easy handling and minimized losses of bitumen.

The invention claimed is:

1. A bituminous composition comprising at least one bitumen and a mixture:
of at least one molecule of general formula (I):

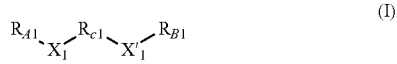
(I)

and of at least one molecule of general formula (II) and/or at least one molecule of general formula (III):

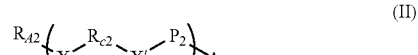
(II)

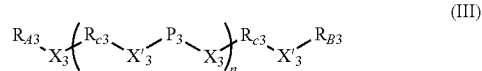
(III)

in which:
$R_{C1}$, $R_{C2}$ and $R_{C3}$, which may be identical or different, represent a hydrocarbon-based chain comprising from 2 to 26 carbon atoms and optionally comprising one or more heteroatoms, $R_{A1}$, $R_{A2}$, $R_{A3}$, $R_{B1}$ and $R_{B3}$, which may be identical or different, represent a hydrocarbon-based group comprising from 4 to 200 carbon atoms and optionally comprising one or more heteroatoms, $X_1$, $X'_1$, $X_2$, $X'_2$, $X_3$ and $X'_3$, which may be identical or different, represent a chemical function chosen from urethane, urea, amide, hydrazide and oxamide functions, $P_2$ and $P_3$, which may be identical or different, represent a hydrocarbon-based group comprising from 10 to 400 carbon atoms, and optionally comprising one or more heteroatoms, A is the residue of a multifunctional coupling agent, n and m are integers between 1 and 20.

2. The bituminous composition as claimed in claim 1, in which A is a trifunctional or quadrifunctional residue.

3. The bituminous composition as claimed in claim 1, in which $R_{C1}$, $R_{C2}$ and $R_{C3}$, which may be identical or different, represent a hydrocarbon-based chain comprising from 4 to 18 carbon atoms.

4. The bituminous composition as claimed in claim 1, in which $R_{A1}$, $R_{A2}$, $R_{A3}$, $R_{B1}$ and $R_{B3}$, which may be identical or different, represent a hydrocarbon-based chain comprising from 4 to 150 carbon atoms or an oligomer chosen from polyolefins, polyether oxides, polyacrylates, polymethacrylates, polysulfides, polystyrenes, polybutadienes, polyisobutenes, polyisoprenes, polyesters, polyamides, polysiloxanes, polyvinyl chlorides (PVC) and polytetrafluoroethylenes (PTFE).

5. The bituminous composition as claimed in claim 4, in which $R_{A1}$, $R_{A2}$, $R_{A3}$, $R_{B1}$ and $R_{B3}$, which may be identical or different, represent a hydrocarbon-based chain chosen from octadecyl, oleyl, hexadecyl, tetradecyl, pentadecyl, heptadecyl, eicosyl, dodecyl, tridecyl and undecyl.

6. The bituminous composition as claimed in claim 1, in which $X_1$, $X'_1$, $X_2$, $X'_2$, $X_3$ and $X'_3$, which may be identical or different, represent a urethane or urea function.

7. The bituminous composition as claimed in claim 6, in which, in the at least one molecule of general formula (I), $X_1$ and $X'_1$ are identical and represent a urea function.

8. The bituminous composition as claimed in claim 6, in which, in the at least one molecule of general formula (II), $X_2$ and $X'_2$ are identical and represent a urea function or a urethane function.

9. The bituminous composition as claimed in claim 6, in which, in the at least one molecule of general formula (III), $X_3$ and $X'_3$ are identical and represent a urea function or a urethane function.

10. The bituminous composition as claimed in claim 1, in which $P_2$ and $P_3$, which may be identical or different, represent a saturated linear hydrocarbon-based chain.

11. The bituminous composition as claimed in claim 1, in which the at least one molecule of formula (I) has a molar mass of less than 20 000 g·mol$^{-1}$.

12. The bituminous composition as claimed in claim 1, in which the at least one molecule of formula (II) or (III) has a molar mass of less than 200 000 g·mol$^{-1}$.

13. The bituminous composition as claimed in claim 1, comprising from 0.1% to 30% by mass of the mixture of the at least one molecule of general formula (I) and of the at least one molecule of general formula (II) and/or the at least one molecule of general formula (III) relative to the total mass of the bituminous composition.

14. The bituminous composition as claimed in claim 1, comprising from 70% to 99.9% by mass of bitumen relative to the total mass of the bituminous composition.

15. The bituminous composition as claimed in claim 1, which is solid and in divided form at ambient temperature.

16. The bituminous composition as claimed in claim 15, which is in the form of pellets or blocks.

17. A process for preparing a bituminous composition as claimed in claim 1, which comprises the following steps:
providing a bituminous binder comprising at least one bitumen,
placing the at least one molecule of general formula (I) and the at least one molecule of general formula (II) and/or the at least one molecule of general formula (III), at a temperature of between 70 and 220° C., in contact with the bituminous binder, and then optionally placing the bituminous composition in divided form.

18. The bituminous composition as claimed in claim 1 which is in the form of a kit comprising, in at least two separate housings of the same packaging:
at least one molecule of general formula (I):

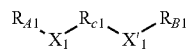
(I)

and at least one molecule of general formula (II) and/or at least one molecule of general formula (III):

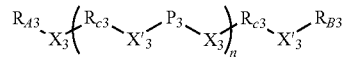
(II)

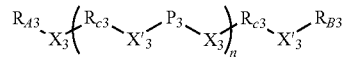
(III)

in which:
$R_{C1}$, $R_{C2}$ and $R_{C3}$, which may be identical or different, represent a hydrocarbon-based chain comprising from 2 to 26 carbon atoms and optionally comprising one or more heteroatoms,
$R_{A1}$, $R_{A2}$, $R_{A3}$, $R_{B1}$ and $R_{B3}$, which may be identical or different, represent a hydrocarbon-based group comprising from 4 to 200 carbon atoms and optionally comprising one or more heteroatoms,
$X_1$, $X'_1$, $X_2$, $X'_2$, $X_3$ and $X'_3$, which may be identical or different, represent a chemical function chosen from urethane, urea, amide, hydrazide and oxamide functions,
$P_2$ and $P_3$, which may be identical or different, represent a hydrocarbon-based group comprising from 10 to 400 carbon atoms and optionally comprising one or more heteroatoms,
A is the residue of a multifunctional coupling agent,
n and m are integers between 1 and 20,
and a bitumen base.

19. The bituminous composition as claimed in claim 1 which is a surface dressing, a hot surfacing mix, a cold surfacing mix, a cold-cast surfacing mix, a gravel emulsion, a base course, a tie course, a tack course, a surface course, a rut-resistant course, a draining surfacing mix, or an asphalt, a sealing covering or an impregnation membrane or coat.

20. A mixture of molecules comprising:
at least one molecule of general formula (I):

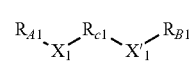
(I)

and at least one molecule of general formula (II) and/or at least one molecule of general formula (III):

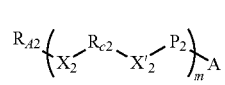
(II)

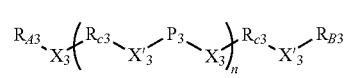
(III)

in which:
$R_{C1}$, $R_{C2}$ and $R_{C3}$, which may be identical or different, represent a hydrocarbon-based chain comprising from 2 to 26 carbon atoms and optionally comprising one or more heteroatoms,
$R_{A1}$, $R_{A2}$, $R_{A3}$, $R_{B1}$ and $R_{B3}$, which may be identical or different, represent a hydrocarbon-based group comprising from 4 to 200 carbon atoms and optionally comprising one or more heteroatoms,
$X_1$, $X'_1$, $X_2$, $X'_2$, $X_3$ and $X'_3$, which may be identical or different, represent a chemical function chosen from urethane, urea, amide, hydrazide and oxamide functions,
$P_2$ and $P_3$, which may be identical or different, represent a hydrocarbon-based group comprising from 10 to 400 carbon atoms, and optionally comprising one or more heteroatoms,
A is the residue of a multifunctional coupling agent,
n and m are integers between 1 and 20.

* * * * *